Oct. 30, 1956 A. G. DEMBOWSKI 2,769,106
REACTION INDUCTOR ALTERNATOR
Filed Feb. 6, 1953 3 Sheets-Sheet 1
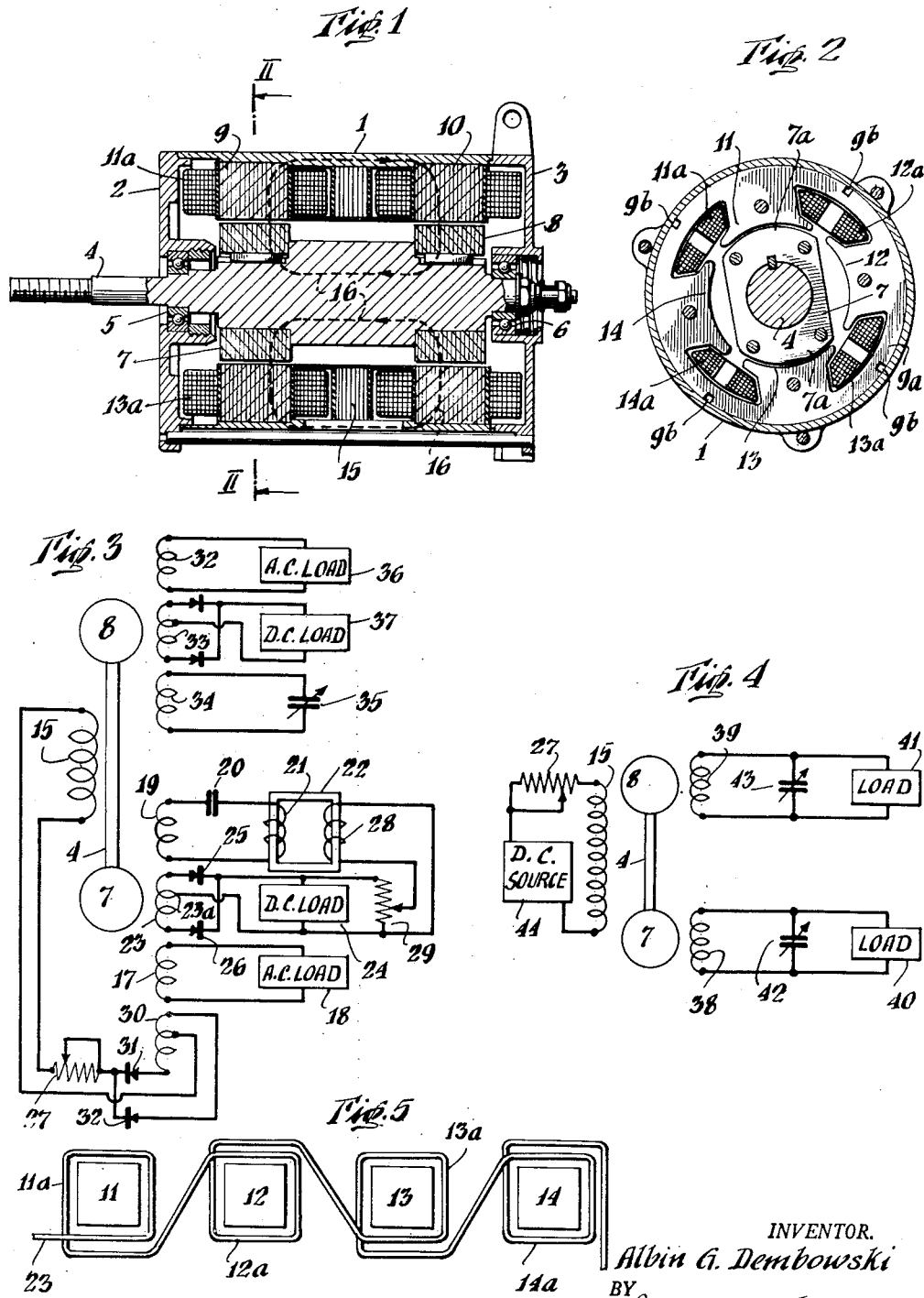
INVENTOR.
Albin G. Dembowski
BY
Robert A. Dunham
ATTORNEY

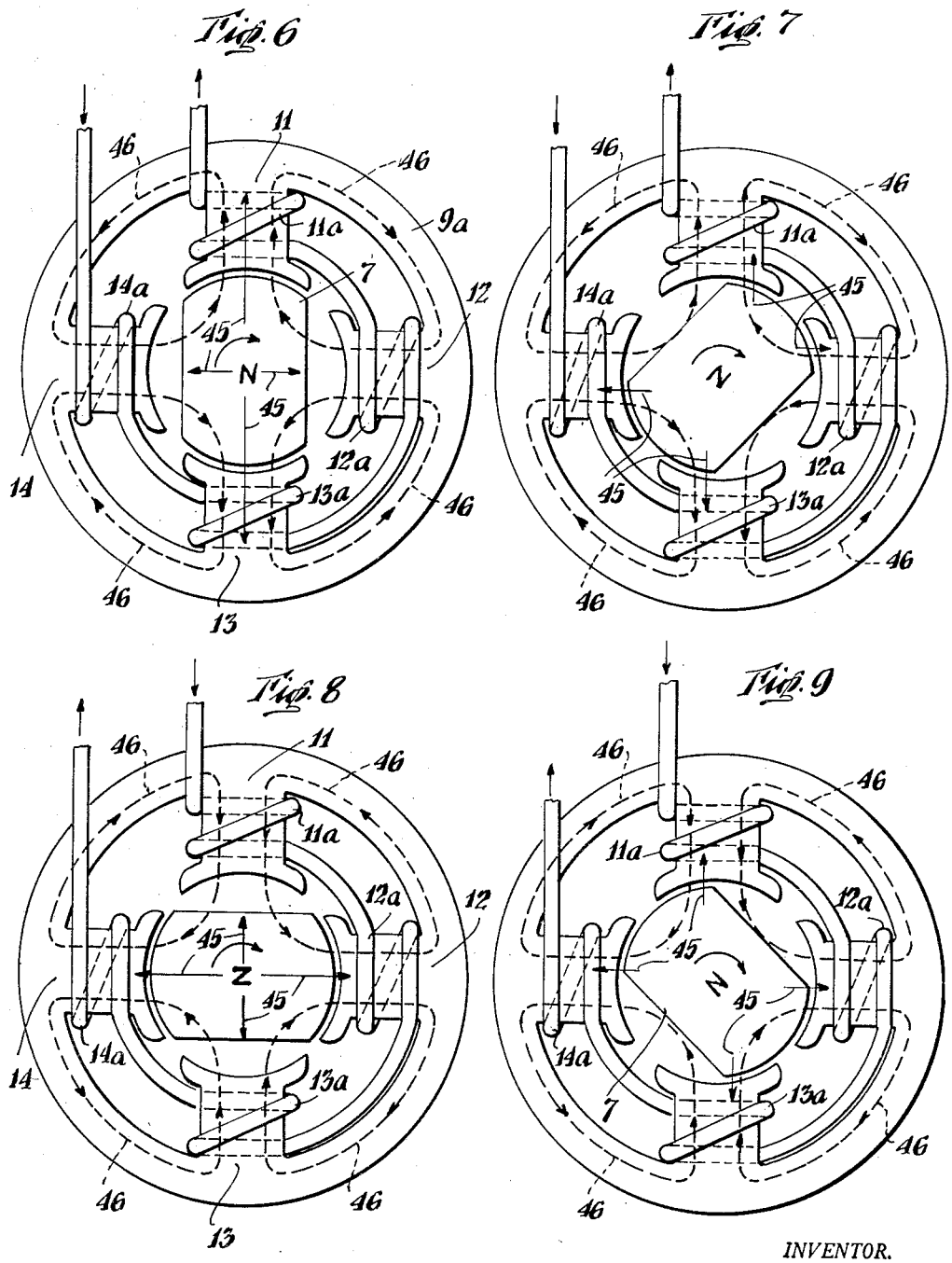

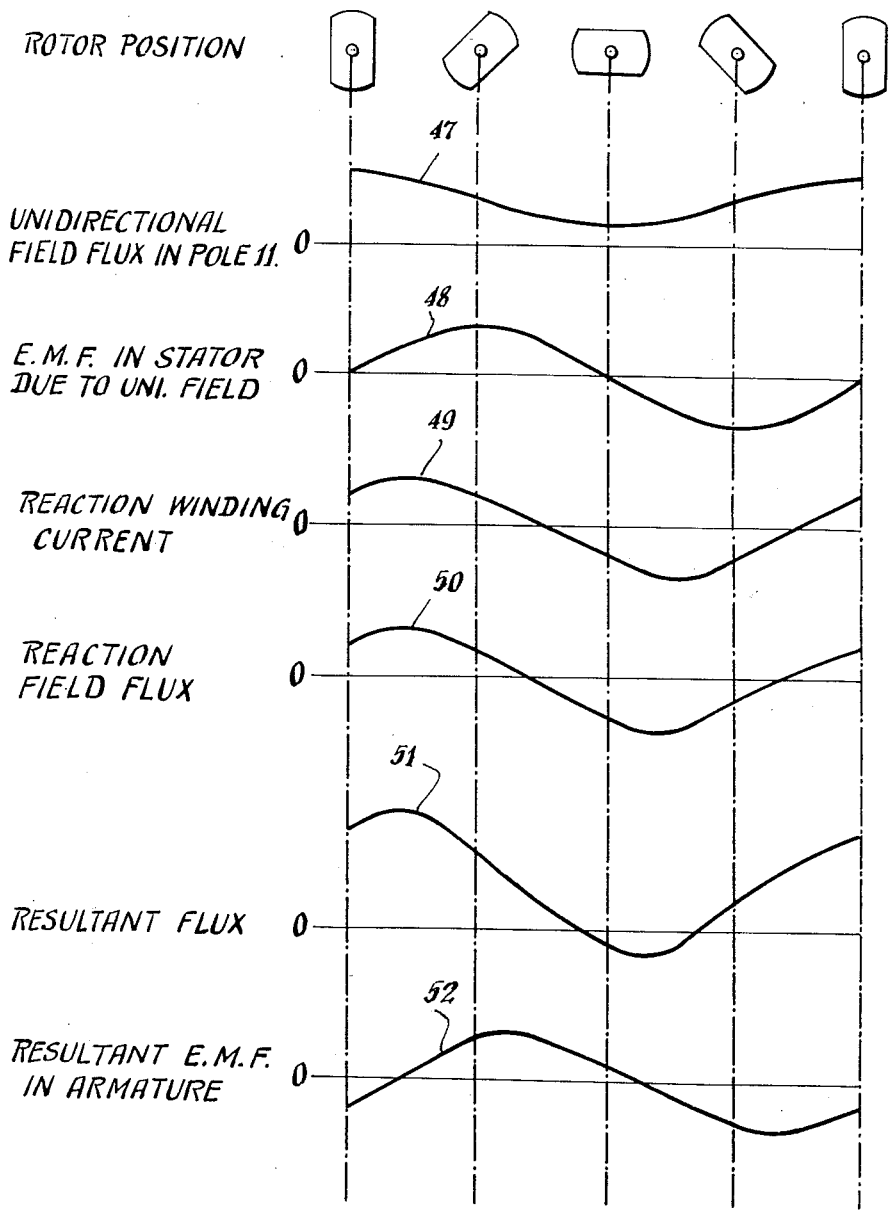

United States Patent Office 2,769,106
Patented Oct. 30, 1956

2,769,106

REACTION INDUCTOR ALTERNATOR

Albin G. Dembowski, Rockville, Conn., assignor to United Aircraft Corporation, East Hartford, Conn., a corporation of Delaware Application February 6, 1953, Serial No. 335,426

8 Claims. (Cl. 310—168)

The present invention relates to inductor alternators. In a conventional inductor alternator, the magnetic flux is unidirectional, being supplied by a permanent magnet or by a field winding energized by direct current. This flux is commonly directed along a magnetic path which includes the outer shell of a cylindrical housing, a rotating shaft extending along the axis of the housing and radially extending stator and rotor structures mounted respectively on the housing and the shaft at one or, more typically, both ends thereof. The stator structures have inwardly projecting poles which carry the armature windings. The rotor structures have outwardly projecting poles. The winding or magnet which supplies the unidirectional field is concentric with the shaft and housing and may be mounted either on the stationary cylindrical shell structure or on the shaft. In the latter case, if a winding is used, it is necessary to conduct electric current to it by means of slip rings.

The air gap between any given projecting stator pole and the rotor, varies cyclically as the rotor turns, because of the projecting contour of the rotor poles. The reluctance of the magnetic path of the unidirectional flux through each stator pole and coil, is thereby varied cyclically as the rotor turns. This cyclical variation in the flux through the stator coils induces an electromotive force in those coils.

Inductor alternators have been known for many years. Their earliest applications were in the communications field, where they were utilized to provide a relatively high frequency electromotive force with a relatively low shaft speed. (The output frequency of such an alternator is equal to the number of poles on the rotor times the shaft speed. Hence, by making a rotor with a large number of poles, a high frequency can be secured with a moderate shaft speed.)

Conventional inductor alternators have a relatively low output for their size and weight, as compared to alternators of other types. In any alternator, the output voltage depends on the rate of change of flux through the armature windings. In synchronous alternators, the flux alternates in direction, and the positive and negative maximum values are equal, so that the total change in flux through a given cycle is equal to twice the maximum flux. In an inductor alternator the flux alternates between a maximum and a minimum value in the same direction, so that the total change in flux in one cycle is less than the maximum flux. Consequently, for a given output voltage, more than twice as many turns are required in the armature windings of an inductor alternator as compared to a synchronous alternator. Since the reactance of a winding is proportional to the square of the number of turns, the conventional inductor alternator is a very low power factor machine. The large armature reaction flux produced by a current which lags the electromotive force considerably necessarily includes a large component which opposes the main field flux, so that such machines inherently have poor voltage regulation. These and other factors have contributed to make the weight per unit power output of inductor alternators substantially greater than the weight per unit power-output of other types of alternators. Because of these undesirable characteristics, the inductor alternator has never been used except for very specialized purposes, and in fact went almost completely out of use for a long period of years.

With the development of modern aircraft, whose equipment includes substantial electrical loads, it became desirable to provide an alternator for aircraft use. Since operation at high altitudes involves considerable trouble from sparking at the contacts in any alternator employing a rotating contact such as a commutator or slip rings, the inductor alternator was investigated because of the possibility of constructing such a machine with both its field and armature windings stationary, so that no rotating contact would be required. It was found, however, that the conventional inductor alternator had a high weight per unit power output, a disadvantage which adversely counterbalanced the advantage of having no rotating contacts, insofar as applications of the machine to aircraft were concerned.

The principal object of the present invention is to provide an inductor alternator having a weight per unit power output which is comparable to that of alternators of other types.

A further object is to provide an alternator of the type described which is suitable for use on aircraft.

Another object is to provide an inductor alternator wherein the magnetic field due to the armature reaction is controlled in magnitude and phase so as to aid the variation in flux of the unidirectional field.

Another object is to provide a double-ended inductor alternator including means to control individually and independently the armature reaction fields at the opposite ends of the machine.

Another object is to provide an inductor alternator which will operate self-excited. A further object is to provide, in such an alternator, means to limit the flux level at a value substantially below the saturation of the iron.

The foregoing and other objects of the invention are obtained by controlling the magnitude and phase of the armature reaction in an inductor alternator so that the alternating field produced by the armature current combines with the unidirectional magnetic field to produce a resultant field which alternates in direction through the armature windings, thereby utilizing the magnetic parts of the machine more effectively and producing a greater power output for a machine of given weight. This control of the phase and magnitude of the armature reaction field is accomplished principally by connecting a condenser or other capacitive reactance in circuit with the armature windings so as to control the phase and magnitude of the armature current. The flux path of the armature reaction field is different from the flux path of the unidirectional field, and to secure the maximum benefit from the invention, it is necessary to construct the magnetic parts of the stator and rotor which form the reaction field flux path so that they will have ample permeance to convey the magnetic field without excessive iron losses.

The foregoing and other objects of the invention will become more apparent from a consideration of the particular embodiments of the invention which are described in the following specification and illustrated in the accompanying drawings, in which:

Fig. 1 is a longitudinal cross-sectional view of an inductor alternator suitable for use in connection with the present invention;

Fig. 2 is a cross-sectional view taken on the line II—II of Fig. 1;

Fig. 3 is a wiring diagram showing a preferred form of armature winding and electrical circuit arrangement which may be used with the alternator of Figs. 1 and 2 to carry out the invention;

Fig. 4 is a wiring diagram showing an alternative form of armature winding and circuit arrangement;

Fig. 5 is a diagrammatic developed view of the stator poles taken from the inside of the stator, showing the relative directions in which the windings on the successive poles are wound and the connections of those windings;

Figs. 6 to 9 are somewhat diagrammatic views similar to Fig. 2, illustrating the various magnetic fields at four positions of the rotor, and Fig. 10 is a graphical illustration of the variations of several of the fluxes, electromotive forces and currents involved as the rotor turns through one-half revolution.

Figs. 1 and 2

Referring to the drawings, there is shown a generally cylindrical casing 1 having its ends closed by non-magnetic end plates 2 and 3. A shaft 4 is journaled in the end plates 2 and 3 on bearings 5 and 6. The shaft 4 is concentric with the housing or casing 1, and both are constructed of magnetic material.

Mounted on the shaft 4 adjacent the opposite ends of the housing 1 are two rotors 7 and 8. Two corresponding stators 9 and 10 are mounted on the inside of the casing 1 in radial alignment with the rotor 7 and 8, respectively. The rotor 7 and stator 9 are described in detail in connection with Fig. 2. The rotor 8 and stator 10 may be considered as being similar to rotor 7 and stator 9, and no further detailed description thereof will be given.

The rotor 7 is formed of stacked laminations and has two diametrically opposite projecting poles 7a. The stator 9 is similarly formed and comprises a peripheral stator ring 9a and four inwardly projecting poles 11, 12, 13 and 14. Each pole carries a coil winding, the respective windings being designated as 11a, 12a, 13a, and 14a. Each winding may consist of either a single coil, or several electrically separate coils. At the centers of the web sections of the stator ring 9a, between each pair of adjacent poles, are provided notches 9b, which serve to limit the stator flux, as described more completely below.

Mounted on the inside of the housing 1 and concentric therewith is a field winding 15. The field winding 15, when energized with direct current, develops a unidirectional magnetic flux which extends through the magnetic path identified by the dotted lines 16 in Fig. 1. This flux may have either the direction shown by the arrows in Fig. 1 or the opposite direction, but its direction does not change.

A preferred arrangement of the windings 11a to 14a is illustrated in Fig. 3. In this arrangement, each of the four windings 11a to 14a consists of four electrically separate coils. One set of these coils, consisting of one coil from each pole, is connected in series to form an armature winding 17, hereinafter termed a load winding, and adapted for connection to an A. C. load 18 as shown in Fig. 3. Another set of coils is similarly connected in series to form an armature winding 19, hereinafter termed a reaction winding, and the terminals of that winding are connected across a series group consisting of a fixed condenser 20 and a variable impedance, shown as the A. C. winding 21 of a saturable reactor 22.

A third set of coils is connected in series to form another armature winding 23, which is utilized to supply a direct current load 24. The direct current load 24 is supplied through a pair of oppositely poled rectifiers 25 and 26 which are connected across the terminals of winding 23. Winding 23 is provided with a center tap 23a, and the direct current load 24 is connected between the center tap 23a and the common terminal of the rectifiers 25 and 26.

The rectifiers 25 and 26 also supply direct current to a saturating winding 28 on the saturable reactor 22. The current through winding 28 is controlled by a variable resistance 29.

The fourth set of coils is connected in series to form a fourth armature winding 30, which supplies the field winding 15 through rectifiers 31 and 32 and a variable resistance 27.

The opposite end of the alternator, adjacent the rotor 8, is provided with three armature windings 32, 33 and 34, similar in structure and function to the armature windings 17, 23 and 19, respectively. Instead of the fixed condenser and saturable reactor arrangement used to control the current flow through reaction winding 19, a simple variable condenser 35 is connected across the terminals of reaction winding 34. The load winding 32 supplies energy to an A. C. load diagrammatically indicated at 36, and the load winding 33 supplies energy through suitable rectifiers to a D. C. load diagrammatically indicated at 37.

The relative potentials in the various armature windings 17, 19, 30, 32, 33 and 34 are determined by the number of turns in each winding. The number of turns may be varied as required to produce a potential suitable for the particular load to be connected to the winding.

It should be noted that the current flows in the reaction windings 19 and 34 on the opposite ends of the alternator are independently and separately controlled.

Fig. 4 illustrates another circuit which may be used with the alternator of Fig. 1. In this arrangement, each pole of the alternator has a winding consisting of a single coil, and the coils at the respective ends of the alternator are connected to form the armature windings 38 and 39. These windings 38 and 39 supply loads 40 and 41 respectively. Variable condensers 42 and 43 are connected in parallel with the loads 40 and 41, respectively, to control the phase and magnitude of the currents in the windings 38 and 39. The armature windings 38 and 39 of Fig. 4 perform the functions of both the load windings and the reaction windings in Fig. 3. The field winding 15 is illustrated as being supplied from direct current source 44.

Although the circuit shown in Fig. 4 is much simpler than that of Fig. 3, the circuit of Fig. 3 has several practical advantages. One is that the condensers or other variable impedances which control the currents through the reactance windings are entirely independent of the load circuit. Consequently, these variable impedance arrangements may be mounted on the alternator and connected as a permanent part of the alternator assembly.

Another advantage of the arrangement shown in Fig. 3 is that the windings 23, 30 and 33 may be provided with center taps, as illustrated at 23a, so that these windings may be used to supply a direct current load through a simple full-wave rectifier arrangement. The circuit shown in Fig. 3 also permits the use of a higher voltage on the reaction windings 19 and 34 than is desired on the load windings. With a higher voltage on the reaction windings, smaller impedance elements such as condensers 20 and 35 and reactor 22 may be utilized to secure the same performance.

In either circuit, the condenser or other variable impedance connected in circuit with the reaction winding is adjusted or otherwise established at a value which will bring the current in the reaction winding more or less into phase with the variations of the unidirectional flux produced by rotation of the rotor. While variable condensers or impedances are shown for this purpose, fixed condensers and impedances are suitable in many instances.

When either of the circuits of Figs. 3 and 4 is used, each set of four coils which comprise an armature winding is wound on the poles 11 to 14 in the manner illustrated in Fig. 5. Note that the windings 11a and 13a extend counterclockwise about the poles 11 and 13, respectively, and that the windings 12a and 14a extend clockwise about the poles 12 and 14, respectively.

Figs. 6 to 10

Since the coils on adjacent poles are wound in opposite directions, the magnetic fluxes produced by the current flowing in those coils will, at any given instant, be in opposite directions in adjacent poles. In Figs. 6 to 9, the full line arrows 45 illustrate the directions of the flux produced by the unidirectional field, while the dotted line arrows 46 indicate the paths and directions followed by the flux due to the reaction field, which is produced by the current flowing in the armature windings.

The magnetic circuit for the reaction field flux, includes the stator and rotor poles and the stator ring 9a. For example, referring to Fig. 6, the flux produced by the current in coil 11a, when the rotor 7 is in the angular position shown, flows radially outward through pole 11, then divides and flows through the web sections to the next adjacent poles 12 and 14, where it flows radially inward and thence through the rotor 7 to the pole 11. The flux produced by each of the four coils 11a to 14a flows through a similar path. The flux path for the reactance field is therefore quite different from the flux path for the unidirectional field. The reluctance of the reaction field path may be regulated independently of the unidirectional field path reluctance by controlling the cross-sectional area of the web sections between the poles. The notches 9b (Fig. 2) are provided for that purpose. The reluctance of the unidirectional field flux path may be regulated by controlling the cross-sectional area of the housing 1 and of the center section of the shaft 4.

The reluctance of the unidirectional field path through the poles 11 and 13 is at a minimum when the rotor is in the position shown in Fig. 6, whereas the reluctance of the unidirectional field path through poles 12 and 14 is then at a maximum.

As the rotor turns in a clockwise direction from the position of Fig. 6, it reaches the position shown in Fig. 7, wherein the reluctance of the unidirectional field path is at a median value for all poles.

In the rotor position shown in Fig. 8, the reluctance of the unidirectional field path through poles 12 and 14 is at its minimum and the reluctance of that path through the poles 11 and 13 is at its maximum. In Fig. 9, the rotor 7 has turned 45° beyond the position shown in Fig. 8, and the reluctance of the unidirectional field paths for all poles are again at their median value. While the reluctance of the reaction field path is at a minimum for all poles in the rotor positions shown in Figs. 7 and 9, and at a maximum for all poles in the rotor positions of Figs. 6 and 8, nevertheless the variation in reluctance of this path is relatively small, and will be disregarded in the further discussion herein.

In the construction of conventional inductor alternators, the dimensions of the poles and of the web sections between the poles are determined in accordance with the requirements of the unidirectional field flux. Little attention is paid to the requirements of a path for the flux due to the armature reaction field, which is considered undesirable.

In an alternator constructed in accordance with the present invention, the flux path for the reaction field is increased in dimensions so as to avoid substantial saturation of the iron. Those portions of the flux path which are utilized by both the unidirectional field and the reaction field must likewise be increased in dimensions to accommodate both those fields without approaching saturation. This results in a substantial decrease in the copper-to-iron ratio in an alternator constructed in accordance with the present invention as compared to that ratio in conventional inductor alternators, because of the disproportionate increase in the amount of iron in the magnetic circuits as compared to the amount of copper.

The best results in accordance with the present invention are secured in a machine whose magnetic circuits have been constructed in the manner outlined above, to take advantage of the improved phase relationships between the variation in the unidirectional field and the armature reaction field. For example, in a machine whose magnetic circuits were designed with that purpose in view, the maximum output increased with the capacitance of the condenser connected in circuit with the reaction winding from approximately 1500 watts at 65 volts with the reaction winding on open circuit through 2500 watts at 100 volts with 0.2 mfd. capacitance to 4000 watts at 130 volts with 0.4 mfd. capacitance. This particular machine had four poles, a load winding of #16 AWG wire, 25 turns per pole and a reaction winding wound with #27 AWG wire, 300 turns per pole. The machine had a copper-to-iron ratio of 0.44 and weighted 16.5 lbs.

A smaller increase in power output was observed in the case of a machine whose magnetic circuits were constructed in a conventional manner and not specifically designed to provide the necessary permeance to take full advantage of the present invention. In this machine, the armature was provided with four poles, and a load winding of #27 AWG, 42 turns per pole and a reaction winding of #29 AWG wire, 400 turns per pole. With the reaction coil on open circuit, the maximum output was 500 watts at 60 volts. With a 0.2 mfd. condenser connected across the reaction coil, the output was raised to substantially 1000 watts at 90 volts. With a 0.35 mfd. condenser, approximately 1250 watts at 115 volts was obtained. This machine had a copper-to-iron ratio of 2.38 and weighed 13.3 lbs.

Fig. 10 illustrates the variation of the various currents, fluxes and electromotive forces as the rotor 7 turns through the positions indicated in Figs. 6 to 9. The successive rotor positions shown at the top of Fig. 10 correspond to its positions during rotation of the rotor through one-half revolution or one output cycle.

The curve 47 immediately below the schematic illustration of the rotor positions shows the variation of the unidirectional field flux in the pole 11 of the stator. The next lower curve, indicated by the reference numeral 48, shows the sums of the electromotive forces induced in all the stator windings by the unidirectional field flux. These electromotive forces are all in phase and hence additive, even though the flux variations on alternate poles are 180° out of phase, because the alternate poles are wound in opposite directions. The curve 49 shows the current flow through the reaction winding, which may be either of windings 19 and 34 of Fig. 3, or 38 and 39 of Fig. 4. This current flow leads the electromotive force shown by the curve 48. This leading phase relationship of the current and the electromotive force is produced by the condenser connected in series with the winding. The curve 50 shows the variation of the reaction field flux, which is in phase with the current curve 49.

The curve 51 shows the resultant flux through the armature windings. This curve is the sum of the curves 47 and 50. Since the flux in curve 50 is alternating in value and since its maximum value is greater than the minimum value of curve 47, curve 51 is likewise alternating in value although its median value is somewhat displaced from zero.

The curve 52 shows the resultant electromotive force in the main winding due to the resultant magnetic flux.

In order to simplify the curves shown in Fig. 10, no effort has been made to illustrate therein the effect of the alternator load. No load conditions are illustrated. An increase in load would make the effective armature current lag behind the phase relationship shown at 49 in Fig. 10, with a corresponding lag in the reaction field flux, and in the net flux. It may be observed that the maximum effect of the condenser is obtained at no load. It would be possible to arrange the condener or other variable impedance used to control the reaction field so that its impedance varied with the load, and thereby provide a measure of load regulation.

The optimum theoretical phase relationship between the reaction field and the unidirectional field would be to have their variations in phase so that the positive maximum flux of the reaction field would add cumulatively to the maximum flux of the unidirectional field, while the negative maximum flux of the reaction field would be concurrent with the minimum flux in the unidirectional field. This would require that the current in the reaction windings lead the electromotive force produced by the unidirectional flux by 90°. Since the electrical circuit which includes the reaction winding must always have some resistance, it is not possible to secure this theoretical optimum condition. The current in the reaction field should be made to lead the electromotive force due to the unidirectional field by as large an angle as is practical considering other factors such as expense and efficiency. The reaction field is effective to increase the maximum net flux and to reduce or reverse the minimum net flux as long as the current is made to lead the electromotive force induced by the unidirectional field. In other words, in order to to aid effectively the unidirectional field, the reaction field should be as nearly in phase with it as possible, and must be within 90° in phase. This relationship between the two fields is referred to in this specification as "substantially in phase." Consequently, the range of possible adjustments of the capacitive reactance of the condenser connected in series with the armature winding lies between a maximum limited only by practical considerations and a minimum determined by the minimum capacitance necessary to make the current lead the electromotive force induced by the unidirectional field. It may be varied anywhere between these values in order to secure the desired output characteristics of the improved inductor generator. The capacitance may be varied with the load to regulate the output voltage of the alternator. It also may be used for other control purposes.

The magnitude of the unidirectional field, which affects both ends of the alternator, may be varied by adjusting the field current, as by means of the variable resistance 27 (Fig. 3). The magnitude and phase of the two reaction fields at the opposite ends of the alternator may be varied by adjusting the current in the reaction winding of the armature, as by means of variable condensers 35 (Fig. 3), 42, 43 (Fig. 4), saturable reactor 22 (Fig. 3), or other equivalent variable resistance or impedance devices.

Adjustment of the reaction field at one end of the alternator has little effect on the electrical and magnetic conditions at the other end of the alternator, especially if the magnetic circuits are proportioned in the manner indicated herein as preferred, so that the permeance of the flux paths is sufficient to avoid substantial saturation of the iron. Consequently, a double-ended alternator constructed in accordance with the invention may be utilized to feed different loads from its opposite ends. The loads may be of widely varying character, and variations in one load will not affect the supply of electrical energy to the other.

The armature windings and the impedance connected to them are preferably so proportioned with respect to the strength of the unidirectional field that the maximum value of the reaction flux is greater than the minimum value of the unidirectional flux, and hence the resultant flux through the armature windings alternates in direction. If the maximum value of the reaction flux is made sufficiently great, then an alternating resultant flux may be obtained, even over a reasonably wide range of variation in phase of the alternating flux, such as may occur with changes in load.

While an alternating resultant flux is highly desirable in order to get the most effective use of the iron in the magnetic circuits, some benefit will be obtained from the use of the invention, even though the resultant flux does not actually alternate. The spread between the maximum resultant flux and the minimum is always increased by the control of the magnitude and phase of the reaction flux as described herein, with a concomitant increase in the power output and output voltage, even if an alternating resultant flux is not secured.

It will be recognized that the invention is applicable to a single-ended inductor alternator as well as to a double-ended inductor alternator as described above.

It has been found that the use of a reaction winding and a compensating condenser as described above is effective to cause an attenuation of the higher frequencies with a resulting improvement of the wave-form of the alternator output. This attenuation of the higher frequencies is considered to result from the high impedance of the windings to those frequencies, which impedance results from the reactance coil circuit being tuned more or less closely to the fundamental frequency, corresponding to the substantially constant speed at which the alternator is driven.

While the invention in its broader aspects is not limited to use with constant speed alternators, it finds its greatest advantage in connection with constant speed alternators for use as a general power supply for auxiliary equipment on aircraft. Certain modifications of the invention which have been mentioned, for example, those in which the phase controlling condensers and impedances are fixed, are obviously best suited for those applications where the speed and hence the frequency of the alternator are fixed.

As illustrated in Fig. 3, an alternator constructed in accordance with the present invention may be operated self-excited. Since the unidirectional field and the armature reaction field have a cumulative effect on each other, the residual magnetism in the machine is effective, when the machine is started, to start the building up of the flux in the machine which continues until some part of the magnetic circuit reaches saturation. In order to avoid the losses which would be encountered if any large portion of the magnetic circuit was operated at saturation, the notches 9b are provided in the web sections of the stator ring 9a, substantially halfway between the stator poles. These notches reduce the cross-sectional area of the reaction field flux path at that point. The stator ring thereby becomes saturated at the notches and limits the further building up of the flux level in the other parts of the magnetic circuit, so that the losses due to saturation are confined to a very small part of the machine.

Where an alternator constructed in accordance with the invention is operated self-excited as described above, with the flux level limited by means of the notches 9b, it is satisfactory for most purposes to use a fixed condenser in series with the reaction winding. It may also be satisfactory in such a situation, particularly if the characteristics of the load are well established, to use a fixed resistance, or no resistance at all, in series with the field winding 17, and thereby avoid any necessity for external control of the excitation.

An alternator as described herein is not a true inductor alternator, since its magnetic field is not wholly unidirectional, and, in the preferred form, actually alternates in direction where it passes through the armature coils. An alternator constructed in accordance with the invention is therefore preferably described as a reaction inductor alternator.

The alternator described herein will run as a motor, although it is not self-starting. It is sometimes convenient to run the unit as a motor, or rotating transformer, from power supply mains in order to warm up and/or to check the alternator and its connected equipment before actual use of it as an alternator.

While I have shown and described certain preferred embodiments of my invention, other modifications thereof will readily occur to those skilled in the art, and I therefore intend my invention to be limited only by the appended claims.

I claim:

1. In a constant speed reaction inductor alternator, an armature winding, means for directing a fluctuating unidirectional magnetic flux through said winding to induce an alternating electromotive force therein, an electric circuit including said winding, impedance means connected in said circuit and effective to control the magnitude and phase of the current in said winding, means defining a magnetic path through said winding for magnetic flux produced by current flowing therein, the impedances of said winding and of said impedance means having values such that, at the frequency corresponding to said constant speed, the positive maximum value of the alternating flux produced by said current occurs within 90 electrical degrees of the maximum value of said unidirectional flux and has its negative maximum occurring within 90 electrical degrees of the minimum value of said unidirectional flux, so that the resultant flux through said winding has a greater difference between its maximum and minimum values than said unidirectional flux.

2. A reaction inductor alternator as defined in claim 1, in which said impedance means is capacitive.

3. A reaction inductor alternator as defined in claim 2, in which said capacitive impedance means is variable.

4. A reaction inductor alternator comprising a rotor of magnetic material including a shaft and at least two outwardly projecting poles, a stator of magnetic material including an outer ring and poles projecting inwardly therefrom, said stator poles being equal in number to twice the number of rotor poles and aligned radially with said rotor poles, a cylindrical housing of magnetic material concentric with said rotor and extending adjacent the periphery of said stator, means spaced axially from said rotor and stator for creating a unidirectional magnetic field, means including said housing, said stator and said rotor defining a flux path for said field, said flux path extending axially through said shaft, radially through the rotor and stator poles, and parallel to the rotor axis through the housing, a winding on said stator poles including coils wound in opposite directions on alternate poles, said rotor poles being effective upon rotation of the rotor to vary cyclically the reluctance of the path of said unidirectional flux through each coil and hence to vary cyclically the magnetic flux through each coil and thereby to induce an alternating electromotive force in said winding, an electrical circuit including said coils and external capacitance means effective to determine the phase relationship between said electromotive force and the current flowing in said circuit, and means defining a path for flux produced in said poles by said current, said last-mentioned flux path including, for each coil, its associated stator pole, the adjacent stator poles on either side thereof, and the portions of said rotor and of said stator ring between said associated pole and the adjacent stator poles, said last-mentioned path having an alternating magnetic flux induced therein by the current flowing in said circuit, said alternating flux in each coil being controlled in magnitude and time phase by the impedance of said coils and of said external capacitance means, said impedance and external capacitance having values such that the alternating flux has a maximum value greater than the minimum value of the flux of the unidirectional field in that coil and is in a direction to aid the unidirectional flux when that flux is a maximum and to oppose the unidirectional flux when that flux is a minimum, so that the resultant magnetic field across the air gap and through the coils alternates in direction as the rotor turns.

5. A reaction inductor alternator as defined in claim 4, in which said poles and said rotor are of sufficiently large cross-section taken perpendicular to the flux path to carry the sum of the maximum unidirectional field flux and the maximum alternating flux substantially without saturation, and said stator ring between said poles has a sufficiently large radial cross-section to carry the maximum alternating flux substantially without saturation.

6. A reaction inductor alternator as defined in claim 4, in which said means for creating a unidirectional magnetic field comprises a field winding concentric with said shaft and housing, and including a second winding on said stator poles, rectifier means, an electric circuit including said second winding, said rectifier means and said field winding for energizing said field winding with unidirectional electrical energy, said second winding and said last-mentioned circuit being effective to increase the current flow in said field winding upon rotation of the rotor, said field winding and its magnetic circuit being effective to increase the current flow in said rotor windings upon rotation of the rotor, so that the unidirectional flux and said reaction flux increase cumulatively and the alternator is self-excited, said portions of the stator ring between the stator poles having notches extending parallel to the rotor axis and effective to limit the permeance of the reaction flux path and thereby to limit the maximum flux level in both the unidirectional and reaction flux fields.

7. In a reaction inductor alternator, an armature winding, means for directing a fluctuating unidirectional magnetic flux through said winding to induce an alternating electromotive force therein, an electric circuit including said winding, impedance means connected in said circuit and effective to control the magnitude and phase of the current in said winding, means defining a magnetic path through said winding for magnetic flux produced by current flowing therein, said impedance means having a value such that the alternating flux produced by said current has a maximum value greater than the minimum value of the flux of the unidirectional field and the positive maximum value of the alternating flux occurs within 90 electrical degrees of the maximum value of said unidirectional flux, so that the resultant flux through said winding alternates in direction.

8. In a reaction inductor alternator, an armature winding, means for directing a fluctuating unidirectional magnetic fluxthrough said winding to induce an alternating electromotive force therein, a single loop electric circuit including only said winding and external impedance means effective to control the magnitude and phase of the current in said winding, means defining a magnetic path through said winding for magnetic flux produced by current flowing therein, said impedance means having a value such that the positive maximum value of the alternating flux produced by said current occurs within 90 electrical degrees of the maximum value of said unidirectional flux and has its negative maximum occuring within 90 electrical degrees of the minimum value of said unidirectional flux, so that the resultant flux through said winding has a greater difference between its maximum and minimum values than said unidirectional flux, and a second armature winding adapted to supply a load with alternating electrical energy.

References Cited in the file of this patent

UNITED STATES PATENTS

| 1,435,813 | Cutting | Nov. 14, 1922 |
| 2,076,464 | Johnstone | Apr. 6, 1937 |
| 2,119,477 | Weydell | May 31, 1938 |

FOREIGN PATENTS

| 439,955 | Great Britain | Dec. 13, 1935 |
| 512,974 | Germany | Nov. 20, 1930 |
| 590,101 | Great Britain | July 8, 1947 |